Sept. 2, 1930.    C. JACKSON    1,774,977
MOLDING APPARATUS
Filed Dec. 14, 1929

INVENTOR
Corwill Jackson
BY
Chappell & Earl
ATTORNEYS

Patented Sept. 2, 1930

1,774,977

UNITED STATES PATENT OFFICE

CORWILL JACKSON, OF CHICAGO, ILLINOIS

MOLDING APPARATUS

Application filed December 14, 1929. Serial No. 413,980.

In my application for Letters Patent filed January 10, 1929, Serial No. 331,668, I describe and claim a novel method of molding concrete in which high frequency vibrations are set up within the mixture or in which the mold or form containing the mixture is subjected to high frequency vibrations for purposes fully set forth in the said application. My present invention relates to an apparatus for causing or producing such vibrations in which the intensity of the vibrations may be easily varied without varying the frequency.

The main object of this invention is to provide an apparatus of the class described which is adapted to be attached to a mold or form for inducing high frequency impulses or vibrations within the conduits of the mold, and in which the force of the vibrations may be varied through a very wide range without varying the speed or frequency thereof.

Objects pertaining to details and economies of my invention will definitely appear from the description to follow. The invention is defined in the claims.

A structure embodying the features of my invention is clearly illustrated in the accompanying drawing, in which.

Figure 1:
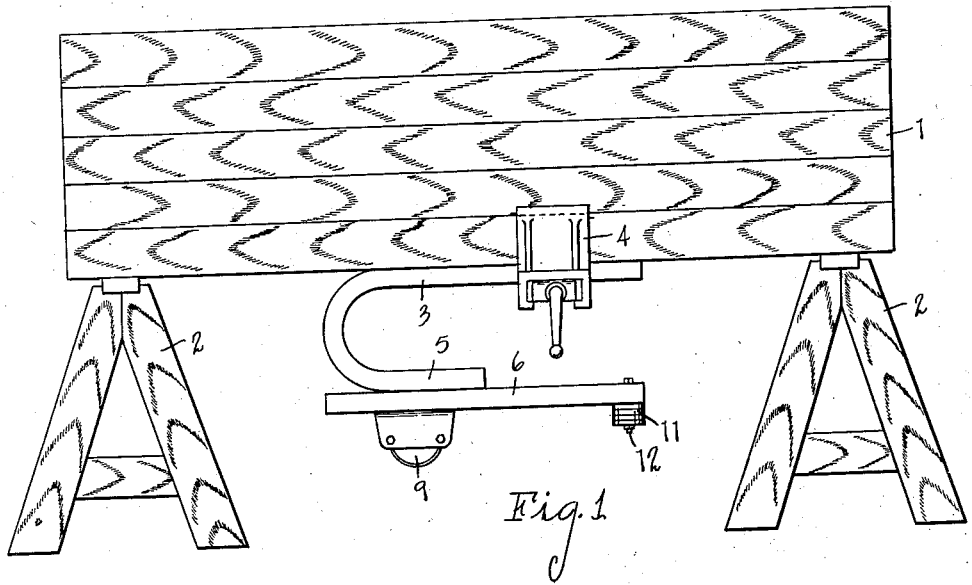
Fig. 1 is a side elevation of a molding apparatus embodying the features of my invention, parts being shown conventionally for convenience in illustration.
Figure 2:
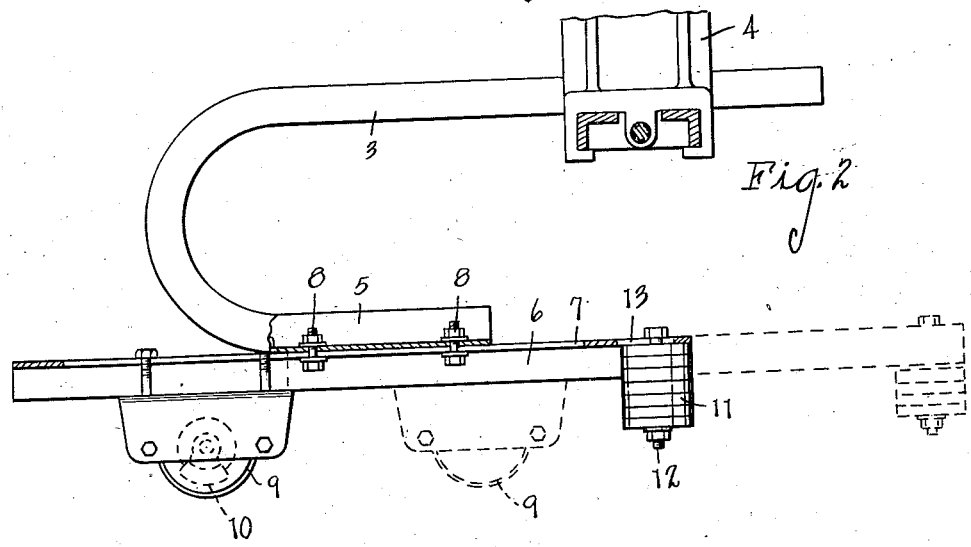
Fig. 2 is an enlarged fragmentary view of the apparatus removed from the form, parts being shown in section and parts in dotted lines to illustrate the adjustment thereof.

Referring to the drawing, 1 represents a mold or form for the molding of concrete, which, in the embodiment illustrated, is supported on horses 2. It will be understood that this form of mold is illustrated herein merely as a matter of disclosing an application of my invention.

I provide a U-shaped resilient support 3 having a clamp 4 shown conventionally in the drawing by means of which one arm of the support may be clamped fixedly to the mold or form. This is shown as clamped on the under side of the mold in this embodiment for convenience in illustrating the same. The other arm 5 of this support is provided with an extension bar 6 having a longitudinal slot 7 therein engaged by the bolts 8 so that the bar may be adjusted, thereby extending or shortening the arm and varying the relation of the parts carried by the bar to the support.

The motor 9 is provided with an unbalancing weight 10 so that the motor constitutes a vibrating unit producing high frequency vibrations. This motor is mounted at the inner end of the bar 6.

The bar is preferably provided with weights 11 at its outer end which are detachably secured by means of the bolt 12 so that the amount of weight may be varied as desired. The bolt is also preferably engaged in a slot 13 in the bar so that the position of the weight may be adjusted relative to the motor, that is, the weight may be adjusted to and from the motor.

Figure 3:
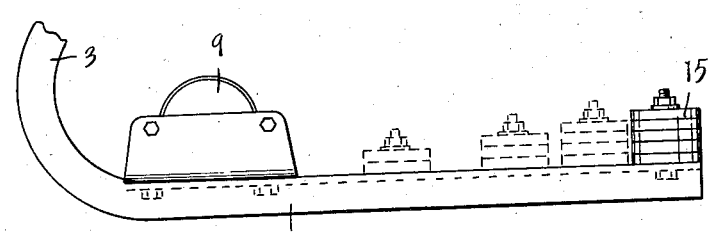
Fig. 3 is a fragmentary side view of a modified form of my apparatus.

In the embodiment shown in Fig. 3 the free arm 14 of the support is of such length that the motor 9 is mounted directly thereon. The weights 15, corresponding to the weights 11, are variable and adjustable on the arm as indicated by dotted lines.

With this arrangement the character of the vibrations, that is, the intensity of the vibrations, may be very greatly varied, at the same time maintaining the uniform frequency. This is especially desirable in molding artificial stone blocks having facings of one character of material and body portions of another character.

It is also sometimes desirable to vary the character of the vibrations with different characters of molds, that is, molds having differently positioned or different-shaped openings.

Molding apparatus embodying my improvements has a very wide range of adaptability.

Having thus described my invention what I claim as new and desire to secure by Letters Patent is:

1. In a molding apparatus, the combination with a form, of a U-shaped support attached to said form by one arm, a bar mounted for longitudinal adjustment on the other arm of said support, a motor provided with an unbalancing weight mounted on the inner end of said bar, and a weight mounted on the outer end of said bar.

2. In a molding apparatus, the combination with a form, a U-shaped resilient support, one arm of which is connected to said form, and a vibrating unit on the other arm of said support.

3. In an apparatus of the class described, the combination of a U-shaped support adapted for attachment by one arm to a part to be vibrated, a vibrating unit mounted on the other arm of said support, and a variable weight on such arm.

4. In an apparatus of the class described, the combination of a U-shaped support adapted for attachment by one arm to a part to be vibrated, a vibrating unit mounted on the other arm of said support, and an adjustable weight on such arm.

5. An apparatus of the class described comprising a resilient support provided with a clamp for attachment to a part to be vibrated, and a vibrating unit adjustably mounted on said support.

6. An apparatus of the class described comprising a resilient U-shaped support adapted for attachment to a part to be vibrated, and a motor having an unbalancing weight mounted on said support for adjustment thereon.

7. An apparatus of the class described comprising a resilient support adapted for attachment to a part to be vibrated, a vibrating unit mounted on said support for adjustment relative to its point of attachment to the part to be vibrated, and a weight adjustably mounted on said support.

8. An apparatus of the class described comprising a resilient support adapted for attachment to a part to be vibrated, and a vibrating unit mounted on said support for adjustment relative to its point of attachment to the part to be vibrated.

9. An apparatus of the class described comprising a resilient support adapted for attachment to a part to be vibrated, a vibrating unit on said support, and a weight adjustably mounted on said support.

10. An apparatus of the class described comprising a resilient support adapted for attachment to a part to be vibrated, and a vibrating unit adjustably mounted on said support.

11. An apparatus of the class described comprising a support adapted for attachment to a mold, a motor mounted on said support and provided with an unbalancing weight, and means for varying the intensity of the vibrations produced by said motor without varying the frequency thereof.

12. An apparatus of the class described comprising a support adapted for attachment to a mold or form, a vibrating unit mounted on said support, and means for varying the intensity of the vibrations without varying the frequency thereof.

In witness whereof I have hereunto set my hand.

CORWILL JACKSON.